April 26, 1932.  C. W. SIRCH  1,855,323
MINUTE FEED APPARATUS
Filed Oct. 3, 1928
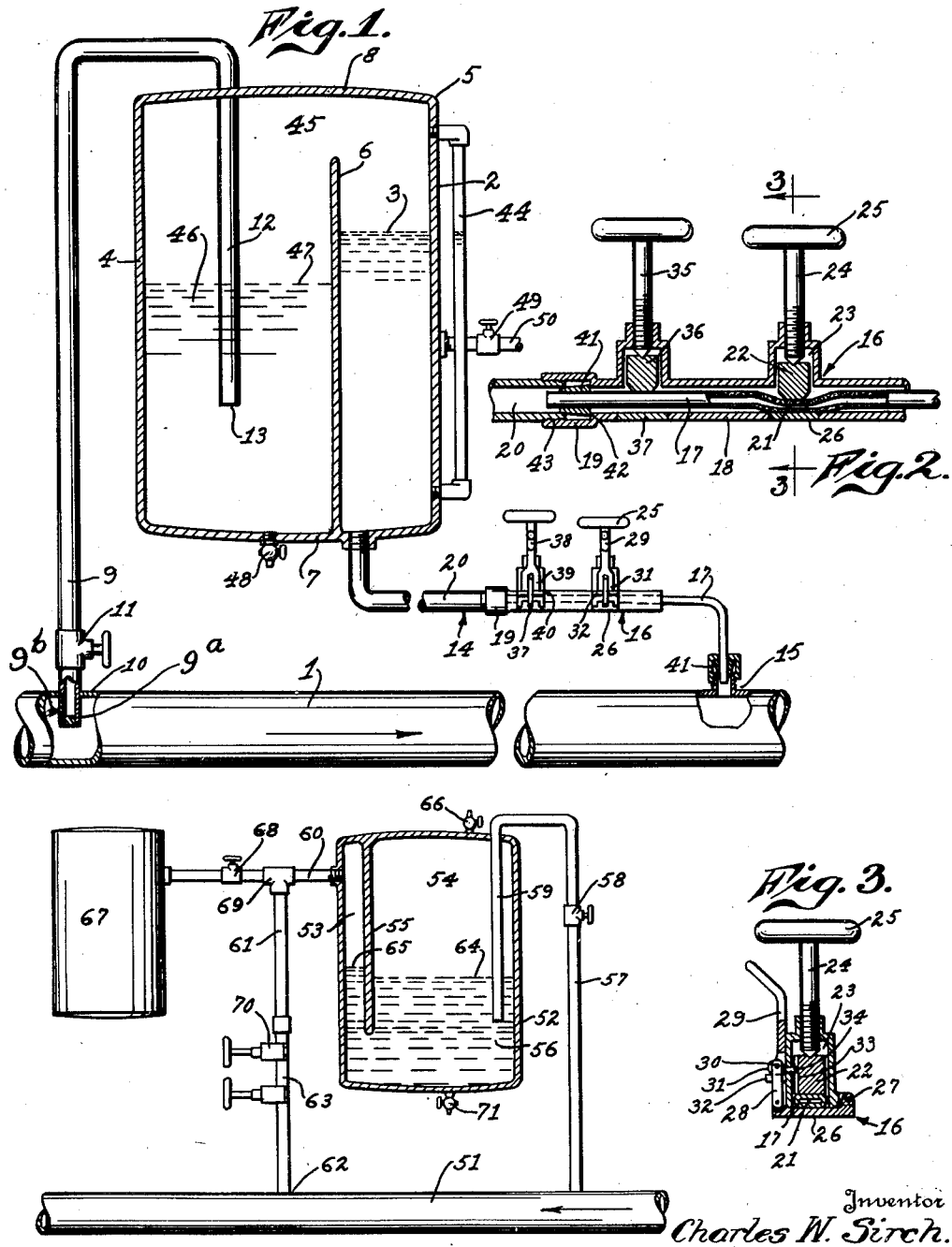
Inventor
Charles W. Sirch.
By Lyon & Lyon
Attorneys Patented Apr. 26, 1932

1,855,323

UNITED STATES PATENT OFFICE

CHARLES W. SIRCH, OF LOS ANGELES, CALIFORNIA

MINUTE FEED APPARATUS

Application filed October 3, 1928. Serial No. 310,152.

This invention relates to apparatus used for introducing small quantities of a substance, for example, a chemical substance, into a pipe-line or vessel containing a material or substance to which the chemical substance is to be added. Such apparatus is useful for chlorinating water or for other purposes which can be effected by the addition of a minute quantity of a substance to a larger quantity of fluid being treated.

While features of the invention are applicable to effect the addition of minute quantities of a chemical substance to a vessel or reservoir, in the present specification I have described the invention as applied to a pipe line through which a fluid or liquid passes.

The general object of the invention is to provide simple means which will be reliable in operation, for effecting the introduction of minute quantities of a substance into a reservoir or pipe-line.

According to the invention I provide a container for the chemical substance in which fluid or liquid gradually accumulates thereby causing a displacement of the chemical substance which in this way is caused to advance through a minute passage into the reservoir or pipe-line to which the substance must be supplied.

One of the objects of the invention is to provide a construction which avoids the use of a needle valve having a minute passage for the reason that such valves tend to clog up with sediment. Accordingly one of my objects is to provide means for presenting a minute passage which can be readily regulated and which can be operated so as to enable it to be readily flushed and cleared of sediment.

A further object of the invention is to provide means for producing a minute passage for the chemical substance which can be set accurately to pass a desired amount of the chemical substance and to provide an independent means for completely shutting off the flow through the minute passage at will.

Further objects of the invention will appear hereinafter.

The invention consists in the novel parts and combination of parts to be described hereinafter, all of which contribute to produce an efficient minute feed apparatus.

A preferred embodiment of the invention is described in the following specification, while the broad scope of the invention is pointed out in the appended claim.

In the drawings, Fig. 1 is a diagrammatic view showing a short portion of a pipe-line and illustrating apparatus embodying my invention connected therewith; the container of the apparatus is shown in vertical section while the piping is shown in side elevation. This view illustrates the apparatus as applied to a pipe-line carrying the liquid.

Fig. 2 is a vertical section upon an enlarged scale passing through the outlet connection from the container that delivers the chemical substance, certain parts being broken away. This view is upon a larger scale than Fig. 1.

Fig. 3 is a vertical section taken about on the line 3—3 of Fig. 2.

Fig. 4 is a view similar to Fig. 1 but showing an adaptation of the apparatus for supplying small quantities of a gaseous substance to a pipe-line.

In practicing my invention I provide a container for the substance which is to be supplied in small quantities to a vessel or pipeline. This container is in communication with another container which may be merely a chamber in the same container that houses the chemical substance. I provide for the gradual accumulation of liquid in the container thereby causing a reduction of volume in the container that results in advancing minute quantities of the chemical substance from the container into the vessel or pipeline.

The container is preferably constructed without the use of flexible diaphragms, as these eventually wear out and must be replaced. In my container all of the walls that retain the chemical substance are preferably rigid and fixed walls. This, however, is not essential in the general practice of the invention.

Where the apparatus is applied to a pipeline, I utilize the difference in pressure at two points on the pipe-line to effect the gradual accumulation of the liquid or fluid in the container, causing a gradual feeding of the chemical substance into the pipe-line.

In Fig. 1, I illustrate the apparatus constructed to supply small quantities of a liquid to a pipe-line, and in this view 1 represents the pipe-line carrying a liquid, for example, water, that is to be supplied with a chemical, for example, chlorine. In order to accomplish this, I provide a container 2 for the chemical substance 3. This container 2 communicates with another container 4 and these two containers 2 and 4 are preferably formed as chambers in the same casing 5, the said chambers or containers being separated by partition wall 6 extending up from the bottom 7 of the container, but leaving a space between its upper edge and the upper head 8 of the container so that the two chambers 2 and 4 communicate with each other over the wall 6.

In addition to this I provide a duct or pipe-connection 9 leading from the pipe-line 1 at a point 10 which is "upstream" with respect to the direction of flow of the liquid as indicated by the arrow. This pipe-connection 9 may include a valve 11 and terminates in a down pipe 12 passing down through the head 8 with its mouth 13 at a depressed point in the chamber 4.

Through the bottom 7 I provide an outlet connection 14 which is a delivery connection to connect the chamber or container 2 with the pipe-line 1 at a point 15 which is "downstream" with respect to the point 10 and this connection 14 includes a bleeder connection 16 which is constructed so as to be capable of nice regulation to produce a minute outlet for the liquid 3.

In order to avoid the use of a needle valve or similar valve to present a minute outlet, I prefer to employ a piece of flexible hose 17. The bleeder connection 16 is in the form of a tubular body 18 through which the flexible hose 17 extends. The end of this hose has a liquid-tight connection 19 to a pipe 20 that forms a part of the connection 14 and which is attached through the bottom 7 of the container. The bleeder connection 16 is constructed so as to enable this hose to be pinched (see Figs. 2 and 3) thereby forming a minute passage 21 through the hose. In addition to this I provide means which can be operated independently of the bleeder opening 21 for completely closing off the flow through the hose at will. This enables the bleeder opening to be set to deliver a given quantity of the liquid as may be desired and it enables the liquid to be completely shut off when desired without disturbing the regulated position for the parts of the apparatus that determine the area for flow through the bleeder opening. In order to accomplish this in the present instance, I provide the tubular body or housing 18 with a pinch block 22 mounted to move up or down in a guide chamber 23 on the upper side of the housing 18 and capable of being forced downward adjustable by means of an adjusting screw 24 with a hand wheel 25 at its upper end. This block 22 operates to pinch the wall of the hose against the bottom of the housing 18.

I prefer, however, to construct the bottom of the housing at this point with a movable section or jaw 26 supported on a pivot pin 27 at one side of the housing and supported at the other side by a link 28 having a lever 29 pivotally attached at 30 to its upper end. This lever 29 has a cam head 31 that rests on a tongue 32 projecting out from the housing on this side. This construction is fully illustrated in Fig. 3. By rotating the lever 29 toward the left, the cam releases the link 28 and the head can then be pulled away from the tongue 32 so as to permit the jaw 26 to drop down. This will permit the hose to open wider at this point and facilitates the flushing of the hose to clear away any sediment that might accumulate in the hose under the pinch block. The pinch block may be guided on one side by means of a guide groove 33 cooperating with a pin 34 that projects in from the side of the guide chamber 33.

The independent means for shutting off the flow may be conveniently mounted in the housing 18 and preferably consists of a lever control device similar to the lever 29 and its associated parts, illustrated in Fig. 3. In other words the construction for this purpose is largely a duplication of that illustrated in Fig. 3 and including an adjusting screw 35 normally screwed up to an elevated position so that the block 36 does not normally pinch the hose. The block 36, however, cooperates with a bottom jaw 37 similar to the jaw 26 and similarly mounted, and also provided with a controlling lever 38 with a cam head 39 cooperating with a tongue 40 similar to the tongue 32.

The liquid-tight connection 19 may include a conical bushing 41 that is forced into the end of the pipe 20 by engaging at its butt end, a shoulder 42 in the connection 19, which is belled out or enlarged to receive the bushing and provided with threads 43 for connecting it to the end of the pipe 20.

At the point 15 a construction similar to that illustrated at the connection 19 is provided (see Fig. 1). In order to indicate the level of the liquid 3 the side of the container may be provided with a sight gauge 44.

The interior of the upper portion of the casing 5 constitutes an air chamber 45. In the operation of this embodiment of the apparatus, when the valve 11 is opened and the bleeder connection and block 36 set as illustrated, the water or other liquid flowing in the pipe 1 will gradually accumulate and form a pool or bath 46 of the liquid in the container 4 and the level 47 of this liquid 46 will gradually rise. The rising level of the liquid 46 prevents the formation of a partial vacuum in the air chamber 45 that might interfere with the outward flow of the chemical through the connection 14. The accumulation of the liquid 46 also operates to displace the air in the upper portion of the chamber 4 and force it over into the upper end of the chamber 2 thereby gradually increasing pressure on the upper surface of the chemical 3 which will also tend to cause a gradual outflow of the chemical through the connection 14.

When it is desired to fill the chamber or container 2 with the chemical liquid 3, this can be accomplished by opening a stop cock 48 at the bottom of the chamber 4, after closing the valve at 11. At the same time a valve 49 should be open in the inlet pipe 50 to the side wall of the chamber 2. As the level of the liquid in the chamber 4 falls, a partial vacuum will be developed in the air chamber 45 that will permit the chemical to flow into the chamber 2.

In Figure 4 I illustrate an adaptation of the apparatus which enables it to be employed for delivering minute quantities of a gaseous substance. As illustrated, this construction is such as to deliver the gas in small quantities into a current of gas flowing through a pipe or main. In this view, 51 indicates a main through which a fluid or liquid flows. I provide a container 52 including a container or chamber 53 for the gas, separated from a chamber 54 within the container 52 by a partition wall 55. The lower end of this partition wall 55 extends below the level of a bath 56 of liquid in the bottom of the container. If the current flowing in the main 51 is a gas, then in the operation of the apparatus the chamber 54 operates as an accumultor in which quantities of the gas from the main 51 are collected. For this purpose I provide a connection 57 from the main 51 on the "upstream" side and this connection 57 includes a valve 58 and a down pipe 59, the mouth of which is below the level of the bath 56.

The chamber 53 is connected through pipe connections 60 and 61 with the main 51 at a point, 62, which is "down-stream" with respect to the direction of flow of the gas in the main, indicated by the arrow. In the pipe connection 61 I include a bleeder connection 63 which would have substantially the same construction as the device illustrated in Figures 2 and 3.

As the gas accumulates in the chamber 54 it causes a depression of the level 64 of the bath 56, thereby causing an elevation of the level 65 of this bath in the chamber 53 which carries the gas which is to be supplied to the main 51. In this way small quantities of the gas in the chamber 53 are gradually delivered into the main 51 past the bleeder connection 63.

The chamber 54 may be provided with a vent cock 66 in its upper head which opens communication from the interior of the chamber to the atmosphere.

The gas for the chamber 53 may be supplied from a reservoir 67 carrying gas under low pressure and connected through a valve 68 to a T 69 that connects the pipe connections 60 and 61. By closing the valve 70 that forms a part of the bleeder connection, the valve 68, when opened, will permit gas to flow through into the chamber 53. This will cause a depression of the level 65 as the gas accumulates in the chamber 53. In the operation of the apparatus it will be evident that the water bath 56 operates as a piston in the two chambers 53 and 54.

The apparatus illustrated in Figure 4 can also be used for delivering small quantities of a gas into a pipeline in which a liquid is flowing. When used in this way, the bath 56 collects small quantities of the liquid from the main, thereby causing gradual elevation of the levels 64 and 65 and consequently gradual displacement of the gas in the chamber 53, which gas will escape through the bleeder connection 63 into the main. In this case, the bottom of the container 52 must be provided with a drain-cock 71 to enable the bath or liquid 56 to be drained off when desired.

If the difference in pressure at the points 10 and 15 is insufficient to produce a movement of the substance 3 from its reservoir into a pipe 1, I may provide special means for facilitating this action. This means may consist of a Pitot tube 9a which projects into the pipe 1 at the point 10 and connects with the pipe 9. This tube 9a has a small opening 9b on its upstream side.

It is understood that the embodiment of the invention described herein is only one of the many embodiments this invention may take, and I do not wish to be limited in the practice of the invention, nor in the claim, to the particular embodiment set forth.

What I claim is:

In an apparatus for introducing small quantities of a chemical substance into a pipeline conducting a fluid, the combination of a container having a pipe-connection connected to the pipe-line, a container for the chemical substance communicating with the first named container and having a duct including a flexible tube connected to the pipe-line at a point beyond the first named connection with respect to the direction of flow of the fluid, adjustable means for pinching the flexible tube to produce a minute passage therein for the chemical substance to pass toward the pipeline, said first named container operating to accumulate fluid gradually therein from the pipe-line and thereby gradually displace the chemical substance from its container and advance minute quantities of the same into the pipe-line.

Signed at Los Angeles, Calif., this 21st day of September, 1928.

CHARLES W. SIRCH.